US005862243A

United States Patent [19]

Baker et al.

[11] Patent Number: 5,862,243

[45] Date of Patent: Jan. 19, 1999

[54] SYSTEM FOR EVALUATING BAR CODE QUALITY ON MAIL PIECES

[76] Inventors: Christopher A. Baker, 8732 Cottontail La., Battleground, Ind. 47920; Peter N. Baker, 932 N. Southland Dr., Lafayette, Ind. 47905

[21] Appl. No.: 611,777

[22] Filed: Mar. 6, 1996

[51] Int. Cl.[6] ................................ G06K 7/10; G06K 9/00

[52] U.S. Cl. ........................... 382/101; 209/272; 235/462

[58] Field of Search .................................... 382/100, 101, 382/102; 209/272, 900; 235/462

[56] References Cited

U.S. PATENT DOCUMENTS

| | | | |
|---|---|---|---|
| 4,606,660 | 8/1986 | Bradshaw et al. | 400/62 |
| 4,632,252 | 12/1986 | Haruki et al. | 209/546 |
| 4,641,347 | 2/1987 | Clark et al. | 35/101 |
| 4,660,221 | 4/1987 | Dlugos | 380/23 |
| 4,688,678 | 8/1987 | Zue et al. | 209/552 |
| 5,073,954 | 12/1991 | Van Tyne et al. | 382/18 |
| 5,142,482 | 8/1992 | Sansone | 364/478 |
| 5,216,620 | 6/1993 | Sansone | 364/478 |
| 5,249,687 | 10/1993 | Rosenbaum et al. | 209/3.3 |
| 5,293,431 | 3/1994 | Hayduchok et al. | 382/101 |
| 5,311,597 | 5/1994 | Rosenbaum | 382/101 |
| 5,387,783 | 2/1995 | Mihm et al. | 235/375 |
| 5,422,821 | 6/1995 | Allen et al. | 364/478 |
| 5,431,288 | 7/1995 | Nishijima et al. | 209/584 |
| 5,446,667 | 8/1995 | Oh et al. | 364/464.02 |
| 5,454,038 | 9/1995 | Cordery et al. | 380/23 |
| 5,475,603 | 12/1995 | Korowotny | 364/478 |
| 5,485,000 | 1/1996 | Schneider | 235/494 |
| 5,548,110 | 8/1996 | Storch et al. | 235/472 |
| 5,602,382 | 2/1997 | Ulvr et al. | 235/494 |
| 5,617,481 | 4/1997 | Nakamura | 382/101 |

OTHER PUBLICATIONS

Declaration of Christopher A. Baker Ser. No: 08/611,777.

*Primary Examiner*—Joseph Mancuso
*Assistant Examiner*—Jayanti K. Patel
*Attorney, Agent, or Firm*—Woodward, Emhardt, Naughton Moriarty & McNett

[57] ABSTRACT

A system for evaluating barcoded mail which includes an imaging device to provide an image signal corresponding to an image of a barcode or an address of a mail piece. The system also includes an output device for providing evaluation results and a processor receiving the image signal from the imaging device. The processor generates an address information signal corresponding to the barcode and an address block image signal corresponding to the address. The processor provides an output signal to the output device in accordance with the address information signal and the address block image signal. The output device responds to the output signal to provide an address information image corresponding to the address information signal and an address block image corresponding to the address block image signal for visual comparison. The system also evaluates an image of a mail piece barcode to detect and categorize barcode defects for reporting with a visual facsimile of the barcode.

31 Claims, 9 Drawing Sheets

SYSTEM FOR EVALUATING BAR CODE QUALITY ON MAIL PIECES

BACKGROUND OF THE INVENTION

The present invention relates to evaluating barcodes, and more particularly relates to the detection and reporting of a defective barcode on a mail piece.

Throughout the history of the mail delivery, there has been a gradual evolution whereby the post office encourages mailers to prepare their mail in such a way as to reduce the effort required on the part of the post office for processing such mail. As an inducement to the mailer to prepare the mail in such a way so as to bring about faster mail delivery, the post office offers a postage discount to mailers for such items as presorted mail and printing of ZIP codes.

Recently, the United States Postal Service (USPS) has adopted new ZIP codes which contain more detailed destination information than the original five-digit ZIP code. One new form of ZIP code ("ZIP+4") contains an additional four digit extension which generally identifies an address within a side of residential block. A further enhanced ZIP code system utilizes 11-digit ZIP codes to specify a point of delivery.

Discounts are also given when the mail is marked with a barcode corresponding to the ZIP code. Barcoding enables mail sorting machines to more rapidly sort and route mail from a mailer to a receiver. The Postal Numeric Encoding Technique (POSTNET) was developed by the USPS to provide an optimized barcode system for encoding ZIP code information on mail.

One problem that arises in determining whether a mailer is deserving of a discount is the objective evaluation of barcode quality. One focus of this evaluation should be readability of the mail piece barcode. When a barcode cannot be effectively read or scanned by automation equipment, laborious manual handling of the mail piece typically results. Another troublesome barcoding defect is a barcode that does not correspond to the designated address. Such inaccurately barcoded mail pieces may be misdelivered and frequently result in additional manual handling. In addition to a more objective identification of barcode defects, a concise method of visually reporting and summarizing defects is needed to determine an effective corrective action. Also, such reporting is needed to support the refusal to award a discount to a mailer because of poor barcode quality.

Thus, there is a need for an evaluation system to efficiently detect mail piece barcode defects, including barcode readability and accuracy determinations, with a minimum of laborious operator activity. Preferably, this system should be capable of classifying and reporting a summary of classified defects to facilitate corrective action. Also, it would be preferred for this system to reduce the need for subjective identification and categorization of barcode defects by an operator.

SUMMARY OF THE INVENTION

One feature of the present invention is a process to evaluate mail piece barcodes which includes: providing a barcoded mail piece for evaluation; generating an image of a barcode from the mail piece; evaluating the image with a processor to identify a barcode defect; and presenting a visual a marker indicating the location of the barcode defect.

In another feature of the present invention, a method of evaluating a mail piece having a barcode is disclosed. This method includes decoding the barcode to provide a decoded address corresponding to the barcode; generating an image of at least a portion of an address block appearing on the mail piece; and comparing the image with the decoded address to determine if the barcode is defective.

In still another feature of the present invention, a barcode evaluation method for mail is provided which includes feeding a mail piece to an imaging devide for evaluation and generating an image of a barcode on the mail piece. A processor is used to evalate the image and identify a barcode defect. A defect state is determined. The evaluation results are printed with an image of the barcode and a marker indicating the determined defect state.

One aspect of the present invention is a system for evaluating barcoded mail which includes an imaging device configured to provide an image signal corresponding to an image of a mail piece barcode. A transport device moves mail to the imaging device for evaluation. The system also has an output device for providing evaluation results and a processor which receives the image signal from the imaging device. The processor compares the image signal to barcode requirements data to detect a barcode defect and provides an output signal to the output device if a defect is detected. The output device responds to the output signal to provide a visual barcode defect marker.

Another aspect of a barcoded mail piece evaluation system in accordance with the present invention is a processor which generates a decoded address signal from an image signal. The image signal correspondes to a mail piece barcode and at least a portion of a destination address appearing on a mail piece. The processor provides an output signal to an output device in accordance with the decoded address signal and the image signal. The output device responds by providing a decoded address image corresponding to the decoded address signal and an mail piece image corresponding to the image signal for visual comparison. In a variation of this aspect, the processor compares the decoded address signal and the image signal to detect a barcode accuracy defect and provides an output signal to the output device if a barcode accuracy defect is detected.

Accordingly, it is one object of the present invention to provide a method and system to evaluate mail piece barcode defects.

Another object of the present invention is to provide a method and system for categorizing and reporting mail piece barcode defects.

Further objects, features, and advantages of the present invention shall become apparent from the detailed drawings and descriptions provided herein.

DESCRIPTION OF THE PREFERRED EMBODIMENT

Figure 1:
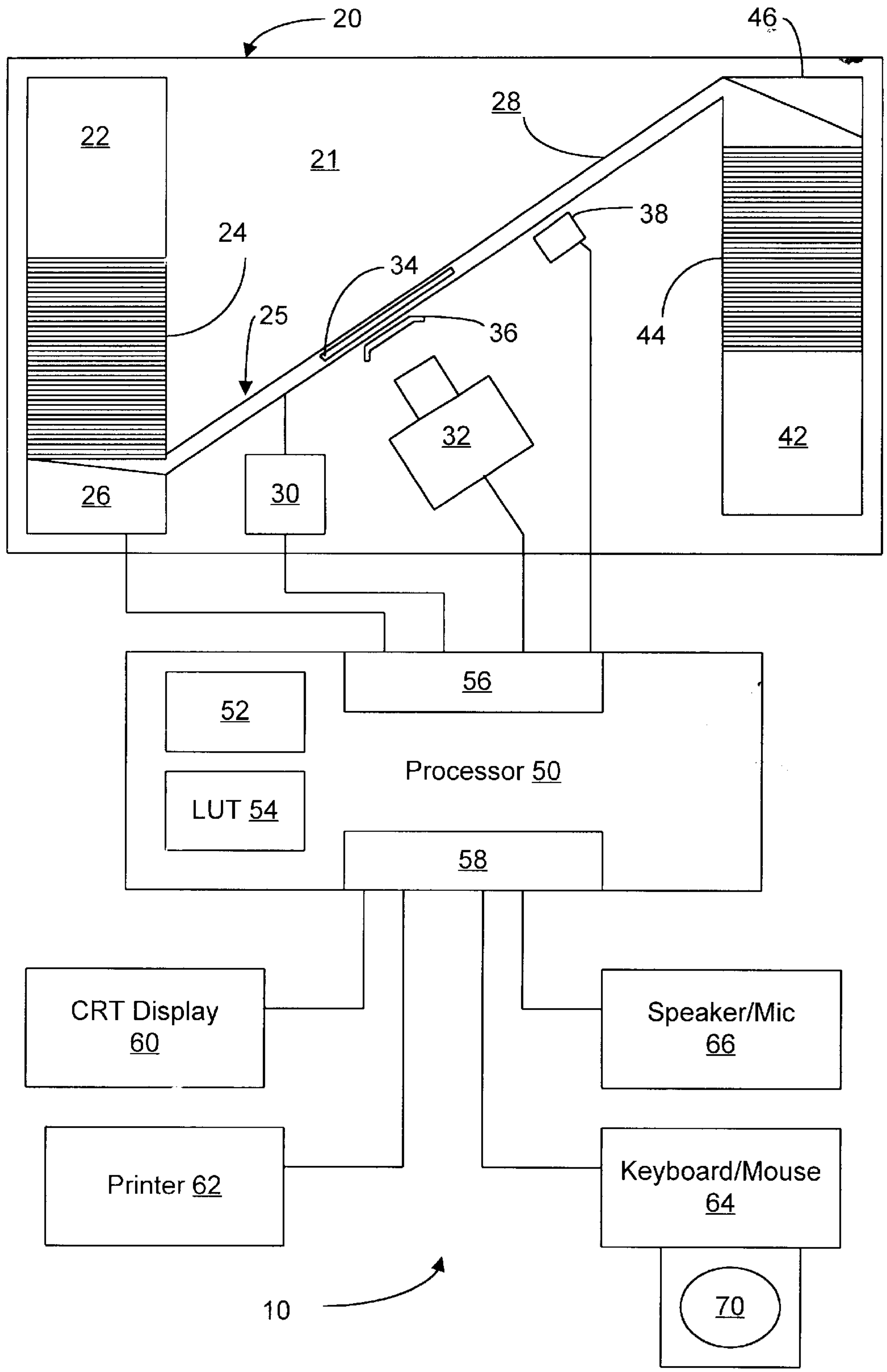
FIG. 1 is a schematic top view of an evaluation station of one preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and any further applications of the principles of the invention as described herein being contemplated as would normally occur to one skilled in the art to which the invention relates.

FIG. 1 schematically depicts a mail piece barcode evaluation station 10 of the present invention. As used herein, "mail" or "mail piece" includes an item entrusted with a postal service or private delivery organization for transport to a designated destination. Station 10 has mail handler 20 coupled to processor 50 having various input/output devices, including keyboard/mouse 64 for interfacing with operator 70.

Mail handler 20 has bed 21 which defines feed bin 22 for holding mail pieces in a mail row 24 for evaluation. Transport system 25 selectively moves mail a piece at a time from feed bin 22. Transport system 25 includes feeder 26, transport path 28 and transport controller 30. Feeder 26 selectively feeds mail from mail row 24 to transport path 28. Transport of a mail piece, such as mail piece 34 shown in transport path 28, is controlled by transport controller 30. In FIG. 1, the direction of travel provided by transport system 25 is generally from left to right, although in other embodiments, the direction of travel path of mail pieces may differ. Transport path 28 and transport controller 30 are of a conventional type commonly used in mail handling systems. Transport system 25 may include pinch rollers or belt conveyors.

Imaging device 32 is configured to selectively provide a signal corresponding to an image of an item viewed adjacent platten 36. Mail piece 34 is shown in this imaging position. Preferably, imaging device 32 is a line scan camera which generates an electric signal corresponding to a scanned image. Alternatively, imaging device 32 may be an area camera, an array of optical sensors, or such other imaging device as would occur to one skilled in the art.

After traveling by imaging device 32, transport system 25 provides for the passage of a mail piece to print head 38. Print head 38 selectively marks mail in transport path 28. Preferably, print head 38 is of the ink jet variety. Alternatively, another type of marking device could be used.

Mail exits transport path 28 into collection bin 42. Collection bin 42 holds mail row 44 after processing along transport path 28. Stacker 46 assembles and maintains evaluated mail row 44 and is of a known type. Alternatively, bins 22, 42 and stacker 46 may be considered components of transport system 25. Instead of collection bin 42, other embodiments may transport mail to a tray or other device after processing in mail handler 20.

Processor 50 is used to coordinate and control various operations of station 10. Processor 50 includes barcode requirements data 52 which provides information pertinent to acceptability of a barcode. Preferably, requirements data 52 includes parameters to comparatively identify a variety of barcode defect states and evaluate severity of a given type of defect. More preferably, defect states and associated severity levels are used to either fail the barcode as unreadable or provide a warning about readability. It is preferred that at least four defect states are detectable. It is more preferred that at least 10 defect states are detectable. It is most preferred that at least 16 defect states are detectable.

Furthermore, processor 50 includes a Look-Up Table (LUT) 54 configured to determine at least a portion of an address corresponding to a proper mail piece barcode. Preferably, LUT 54 is entered with data obtained from scanning a bar code to produce at least a portion of a corresponding multicharacter address. This decoded address may be further processed to verify accuracy of the bar code.

Requirements data 52 and LUT 54 may reside in a store associated with processor 50. This store may be fixed or removable. Preferably, the store is a memory device of the electronic (e.g. solid state), magnetic, or optical variety, which may be readily updated as bar code standards or address/barcode tables change. In one embodiment, data 52, LUT 54, or both are provided from a remote store or other source via a communication device for processing. In this embodiment, the source and communication device are considered to be a portion of processor 50 for the purposes of the present invention.

Processor 50 may be an electronic circuit comprised of one or more components. Similarly, processor 50 may be comprised of digital circuitry, analog circuitry, or both. Also, processor 50 may be programmable, an integrated state machine, or a combination thereof. Preferably, processor 50 is a ruggedized industrial grade programmable personal computer with customized circuitry and software to interface with various components of station 10. This preferred configuration may include communication interfaces such as modem or network links, and subsystems to accommodate removable media, such as compact disks (CDs) or floppy disks.

Processor 50 controls selected operations performed by mail handler 20 through mail handler interface 56. Mail handler interface 56 has operative links to feeder 26, transport controller 30, imaging device 32, and print head 38. Processor 50 is also coupled to a number of Input/Output (I/O) devices common to personal computers via I/O interface 58. I/O devices coupled to processor 50 via I/O interface 58 include Cathode Ray Tube (CRT) display 60, printer 62, speaker/microphone 66, and keyboard/mouse 64. Preferably, CRT display 60 is of the conventional color variety available for personal computer applications. Alternatively, a liquid crystal display or other visual display responsive to processor 60 may be used. Printer 62 is preferably of the laser variety, but could be of another type as would occur to one skilled in the art. Speaker and microphone 66 preferably include interface circuitry to facilitate delivery and reception of audible commands by processor 50; however, in other embodiments speaker/microphone 66 may be absent. The keyboard and mouse of keyboard/mouse 64 may be separate or combined units of a conventional variety. In alternative embodiments, only a mouse or keyboard is employed. In fact, in an embodiment having an audible command system via speaker/microphone 66, keyboard/mouse 64 may be absent.

Figure 2A:
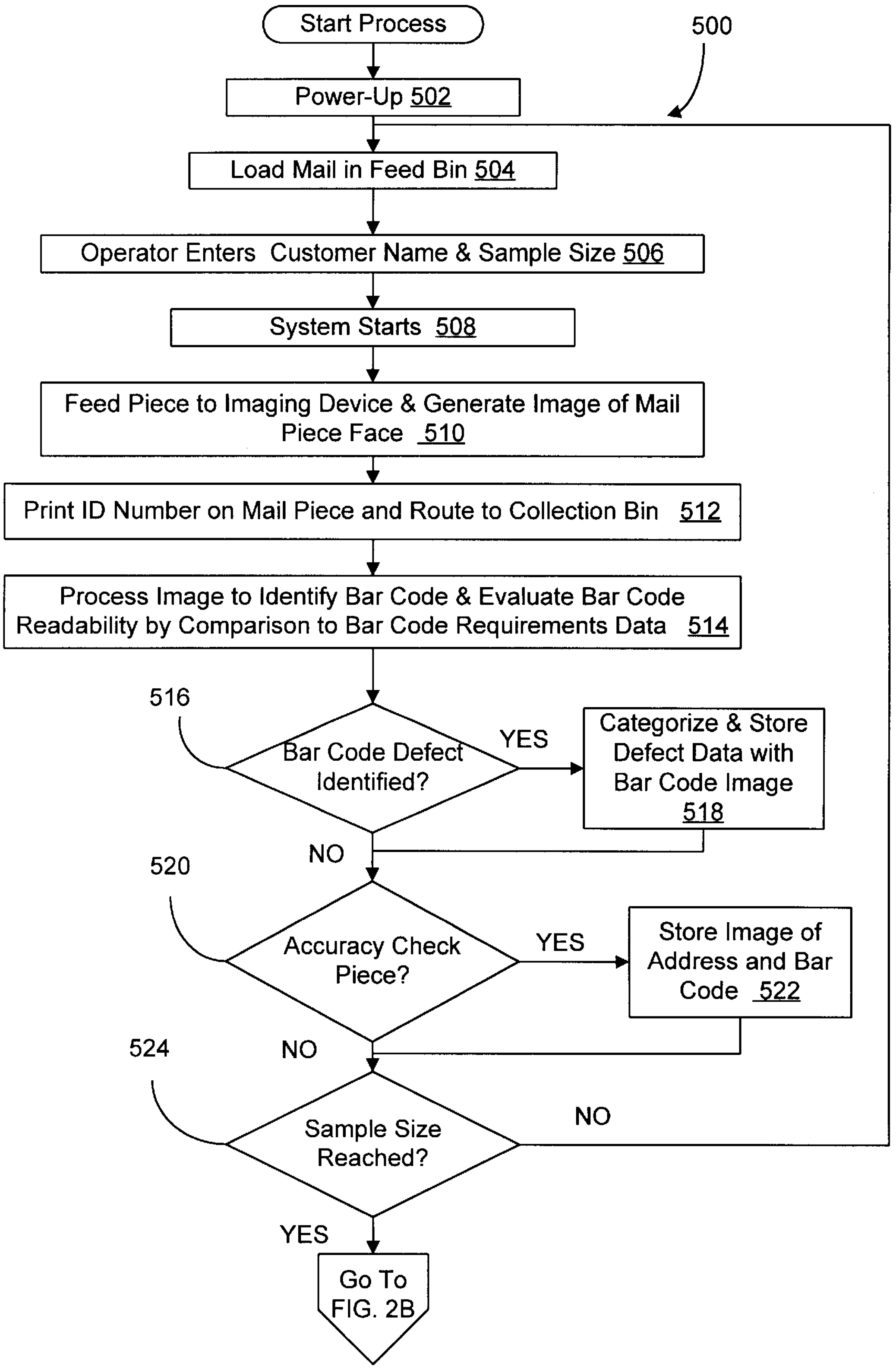
FIG. 2A is a flow diagram of one preferred process of the present invention performed with the embodiment shown in FIG. 1.
Figure 2B:
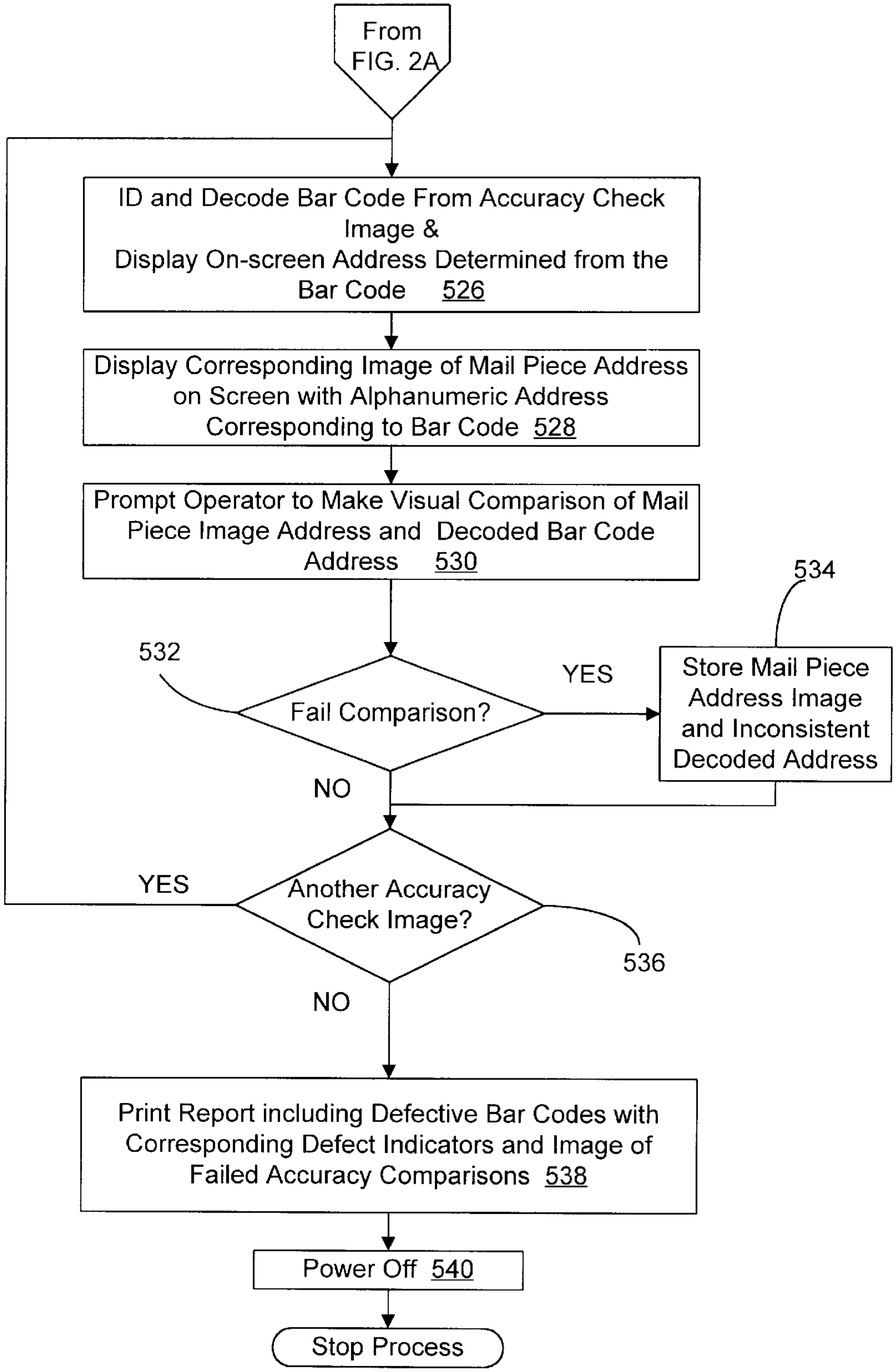
FIG. 2B is a continuation of the flow diagram of FIG. 2A.

FIGS. 2A & 2B illustrates process 500 of the present invention performed with the preferred embodiment depicted in FIG. 1. Process 500 starts with power-up at step 502. Next, mail is loaded in feed bin 22 in step 504. In step 506, operator 70 enters the name of the customer for whom the mail piece barcode evaluation is performed using keyboard/mouse 64 or speaker/microphone 66. Step 506 also includes the entry of the sample size of barcoded mail pieces for the bar code evaluation. Transport system 25 begins to operate in step 508.

Step 510 initiates singulation and feeding of a mail piece from mail row 24 with feeder 26. Also, transport system 30 delivers the mail piece along transport path 28 to platten 36 for scanning by imaging device 32. After imaging, the mail piece is moved to print head 38 and a unique number ("N") or other identifying mark is printed on the mail piece in step 512. The mail piece is then routed to collection bin 42 by transport system 25.

Figure 3:
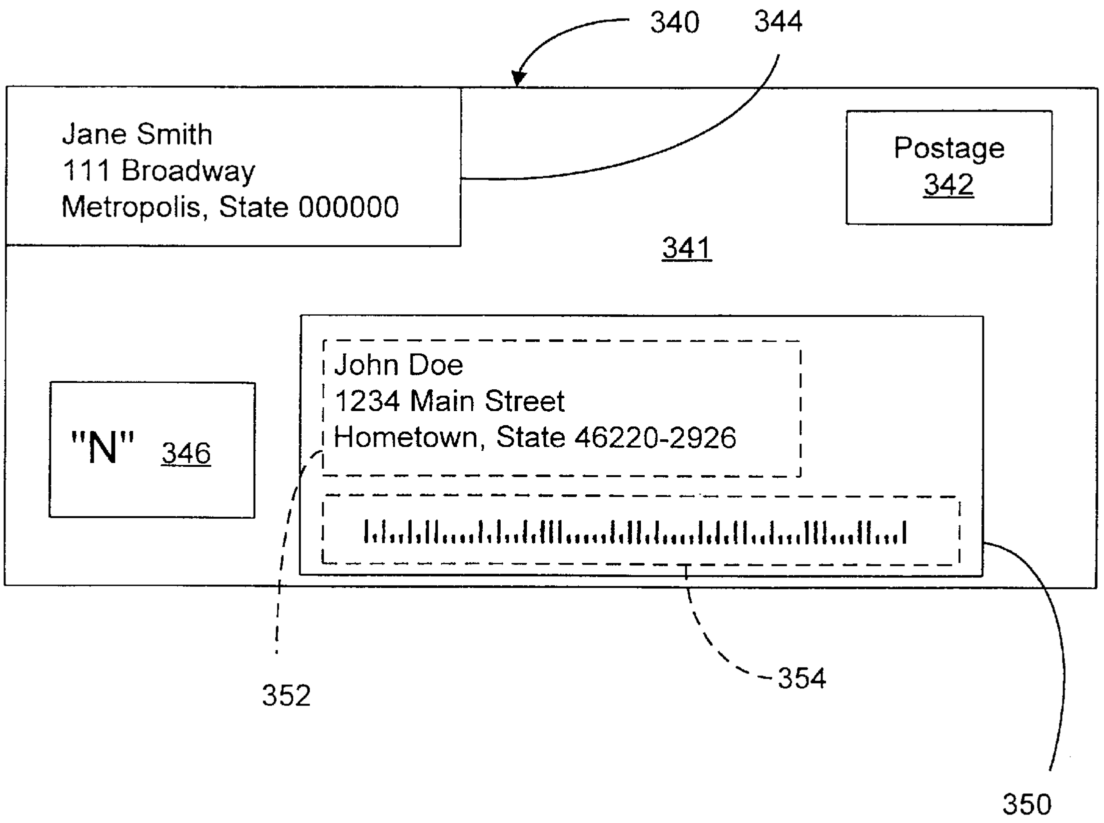
FIG. 3 is a depiction of one example of a mail piece face processed in accordance with the process of FIGS. 2A & 2B.

Referring additionally to FIG. 3, processed mail piece 340 is shown. Face 341 of mail piece 340 includes postage zone 342, return address zone 344, and address block 350. Address block 350 includes an alphanumeric destination address 352 and a barcode 354. Face 341 also includes an identification number "N" at zone 346. Identification number "N" may be supplied by print head 38 to identify the mail piece in relation to the evaluation sequence. Step 512 corresponds to this marking and also includes the routing of mail pieces to collection bin 42 after evaluation.

In step 514, processor 50 receives a signal from imaging device 32 corresponding to the image of the face of a mail piece. Referring to mail piece 340 by way of example, in step 514, processor 50 receives a signal from imaging device 32 corresponding to an image of at least a portion of face 341 of mail piece 340. Processor 50 locates address block 350 and discriminates between images corresponding to destination address 352 and the barcode 354. U.S. Pat. No. 5,431,288 to Nishijima et al., U.S. Pat. No. 5,387,783 to Mihm et al., U.S. Pat. No. 5,249,687 to Rosenbaum et al., U.S. Pat. No. 5,073,954 to Van Tyne et al., and U.S. Pat. No. 4,632,252 to Haruki et al. generally disclose techniques to recognize addresses and barcodes in connection with image processing of mail.

Processor 50 is configured to evaluate barcode readability by comparing the barcode image to barcode requirements data 52. If a defect has been identified as queried in conditional 516, then preferably processor 50 categorizes the defect using requirements data 52 in step 518. It is more preferred that processor 50 determine defect severity to further classify defects as either failures or warnings. It is most preferred that processor 50 recognize and identify multiple defects and associated severity levels. The defect data and associated barcode image are stored for later reporting.

After evaluating for readability defects, control flows to conditional 520 to determine whether the piece has been selected to perform an accuracy check. Preferably, the accuracy check is performed on a randomly selected subset of the sample size entered in step 506. If a mail piece is designated for an accuracy check, then the corresponding address block image is stored for later evaluation in step 522.

Conditional 524 determines whether the sample size entered in step 506 has been reached. If the sample is not complete, control returns to step 504 to feed the next piece for evaluation. If the sample is complete, control flows to step 526 (See FIG. 2B).

Figure 4:
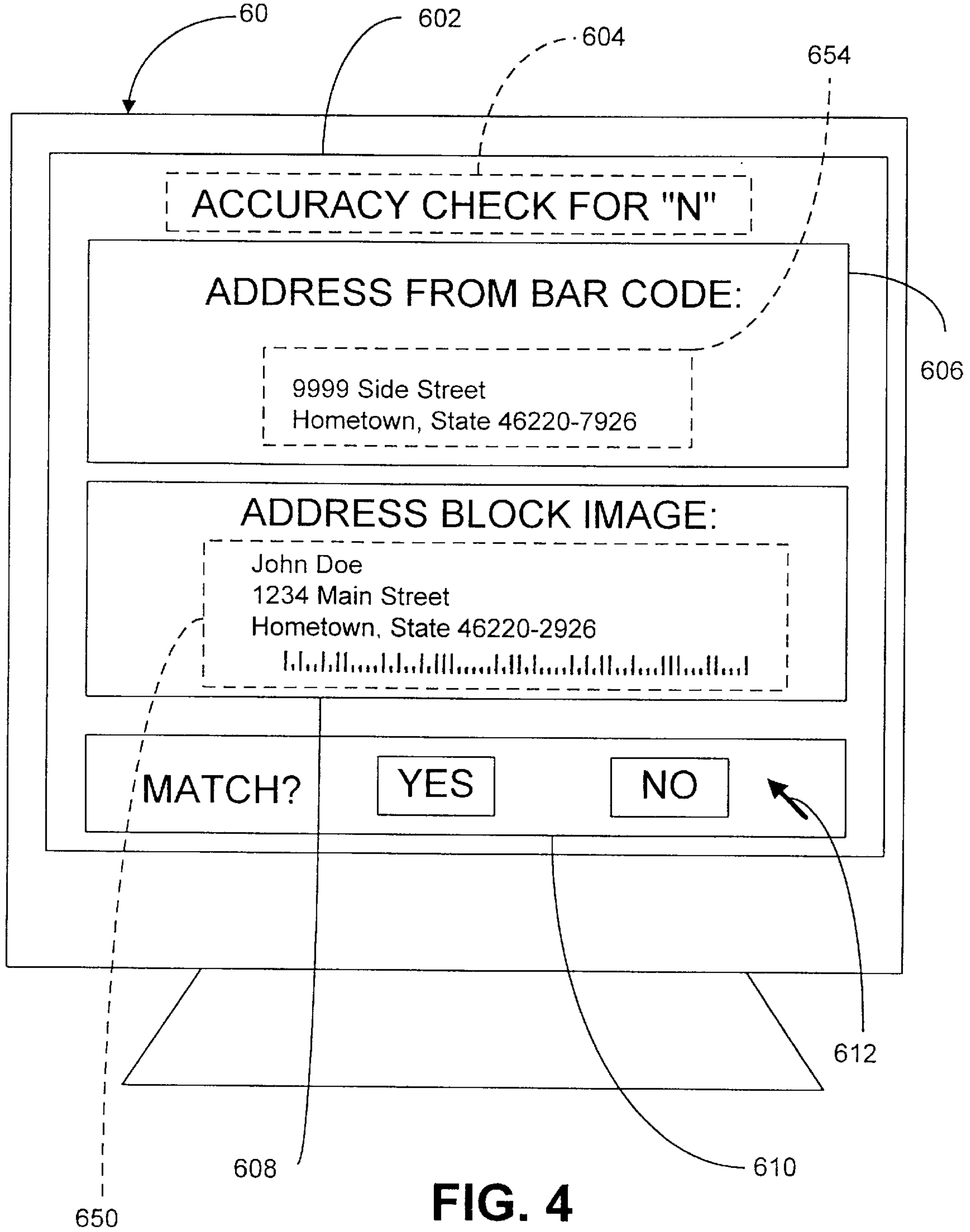
FIG. 4 is a depicition of one example of a visual display in accordance with the process of FIGS. 2A & 2B.

Referring to FIG. 4, a sample screen 602 using display 60 is illustrated which presents results corresponding to the performance of the next three steps, 526, 528, and 530 of process 500. Screen 602 includes a banner 604 to indicate the nature of the operation. Specifically, the accuracy check for a selected piece "N" is indicated. In step 526, the imaged barcode of a stored accuracy check piece is accessed and decoded to determine at least a portion of an address corresponding to the barcode. Preferably, processor 50 performs this operation with LUT 54 using data corresponding to the scanned bar code for entry. This decoded address is then sent as a visual image to display 60. FIG. 4 shows decoded address 654 in output block 606. Decoded address 654 is one example of an output which corresponds to 526. Preferably, step 526 provides a decoded address in a discrete character-based text format such as ASCII, although other formats as would occur to those skilled in the art are also contemplated.

In step 528, the imaged address block is displayed on the screen of display 60 next to the decoded address generated in step 526. FIG. 4 presents one example of the output of step 528 as imaged address block 650 in output block 608. Imaged address block 650 is for the same mail piece having decoded address 654. In one embodiment, imaged address block 650 is presented in a graphical format which readily accommodates hand-written addressing. In alternative embodiments, imaged address block 650 may be converted into a character format or presented as a mixed character and graphical presentation. U.S. Pat. No. 5,475,603 to Korowotny, U.S. Pat. No. 5,431,288 to Nishijima et al., U.S. Pat. No. 5,422,821 to Allen et al., U.S. Pat. No. 5,249,687 to Rosenbaum et al., and U.S. Pat. No. 5,031,223 to Rosenbaum et al. provide various Optical Character Reader (OCR) mail piece processing methods which may be adapted to convert an imaged address block into at least a partial character format.

In step 530, the operator 70 is prompted to indicate whether on-screen images of the decoded address and the destination address appearing on the face of the mail piece match. If there is no match, then the barcode is usually inaccurate. This step avoids the laborious task of culling through evaluated mail pieces to verify barcode accuracy of a sampled sub-set. Output block 610 of screen 602 provides one example of such a prompt with regard to the comparison of decoded address 654 and imaged address block 650. Operator 70 may input this data by using mouse cursor 612 with the "YES" or "NO" button. Alternatively, a keyboard entry or an audible command may be used to input the operator response.

Conditional 532 queries whether a failed comparison (no match) is indicated. If the comparison fails, step 534 provides for storage of the decoded address and corresponding address block image of the mail piece for later reporting in step 538. Control then flows to conditional 536 to determine if additional accuracy checks need to be performed for other mail pieces. If further checks remain, then control loops back to step 526. Otherwise, a report is printed with printer 62 in step 538. In step 540, the system is powered down and process 500 stops.

Notably, the steps and conditionals of process 500 may be configured to generally correspond to various signals or variables associated with station 10. For example, in the case of processor 50, various output signals may result in connection with the generation of defect reports and other signals correspond to data and operations within processor 50. Also, various devices of station 10 exchange signals with processor 50 which may correspond to one or more elements of process 500.

In one alternative embodiment, evaluation by processor 50 of barcode accuracy includes the utilization of OCR. Specifically, in this embodiment, processor 50 determines the characters of at least a portion of the destination address on the face of a mail piece from its image. This discriminated destination address is then compared by processor 50 to the decoded address from the mail piece barcode. This process may avoid the need to involve the operator in the accuracy check determination. In a variation of this embodiment, the operator is prompted to perform barcode accuracy comparisons only when the OCR process cannot be performed within a predetermined amount of time. For example, because some OCR processes perform poorly for handwritten destination addresses, these addresses may be candidates for selective operator comparison.

Preferably, a report is provided by station 10 which includes a visual reproduction of the decoded address and address block image appearing on each mail piece which fails the accuracy check. Also, it is preferred that a copy of unreadable barcodes with defect category indicators be printed for each failed barcode. In an alternative embodiment, barcode warnings are also supplied. In another embodiment, the sensitivity of the barcode defect detection is adjustable and may be tailored to examine barcode process trends for quality control purposes.

Figure 5:
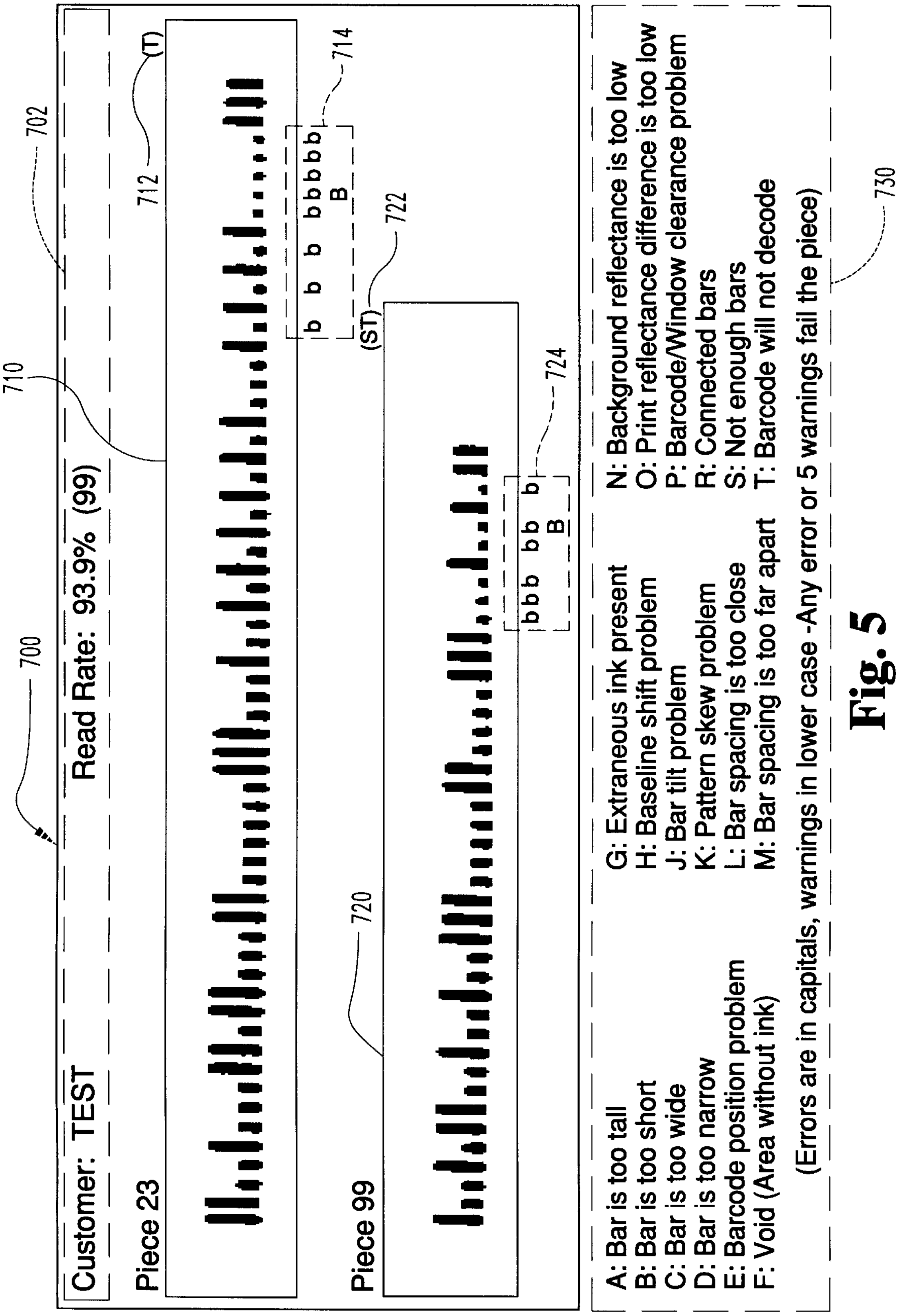
FIG. 5 is a depiction of one example of a report provided in accordance with the process of FIGS. 2A & 2B.

Referring to FIG. 5, one type of barcode readability report 700 is depicted. This report includes a banner 702 indicating the customer and the readability rate. In this case two failed barcodes, 710 and 720 are depicted. "Piece 23" and "Piece 99" correspond to the piece ID numbers "N" placed on the mail pieces by print head 38, for barcodes 710, 720, respectively. In accordance with indicator key 730, defect markers include lower case letters to indicate warnings and upper case letters indicate a failure. Also, in this example, 5 warning defects have been selected to result in a failure. Each block 714, 724 of report 700 provides lower case characters "b" to indicate the location of offending individual bars of each corresponding barcode 710, 720. Specifically, these characters are aligned beneath bars which are believed to be too short (see indicator key 730). Also, "B" is shown beneath the fifth "b" of each block 714, 724 to indicate a failure due to an excess number of warnings. In addition, indicators 712, 722 correspond to other defect states resulting in failure that are generally not location specific (see key 730). Two markers are shown in indicator 722 corresponding to the detection of two defect states for piece 99 which are not location specific. Various other report indicator keys 730 and markers are contemplated as would occur to one skilled in the art.

Report 700 may be varied in length and number of pages to correspond to the number of defective barcodes detected. In one embodiment, report 700 is prepared for presentation on display 60. Other visual display media for reporting barcode defects with corresponding images or facsimiles are contemplated as would occur to one skilled in the art. Furthermore, the storage and transfer of barcode defect data and reports on non-visual electronic, magnetic, or optical media in corresponding formats is contemplated. Notably, in one embodiment, the imaging information is stored on a portable disk for subsequent downloading and evaluation by processor 50 without otherwise coupling to imaging device 32. Also, processor 50 may be used to generate and report various statistical information associated with barcode evaluation.

In another embodiment, defects may be indicated by printing an appropriate indicator on the corresponding defective mail piece with print head 38 after evaluation. In one version of this embodiment, a deflector under the control of processor 50 is included between transport path 28 and stacker 46 to segregate failed mail pieces into a separate reject bin for later review (not shown). Because defect state and location markers are printed directly one the mail piece, the printing of a reproduction of the barcode with appropriate markers may not be necessary for this embodiment.

Figure 6:
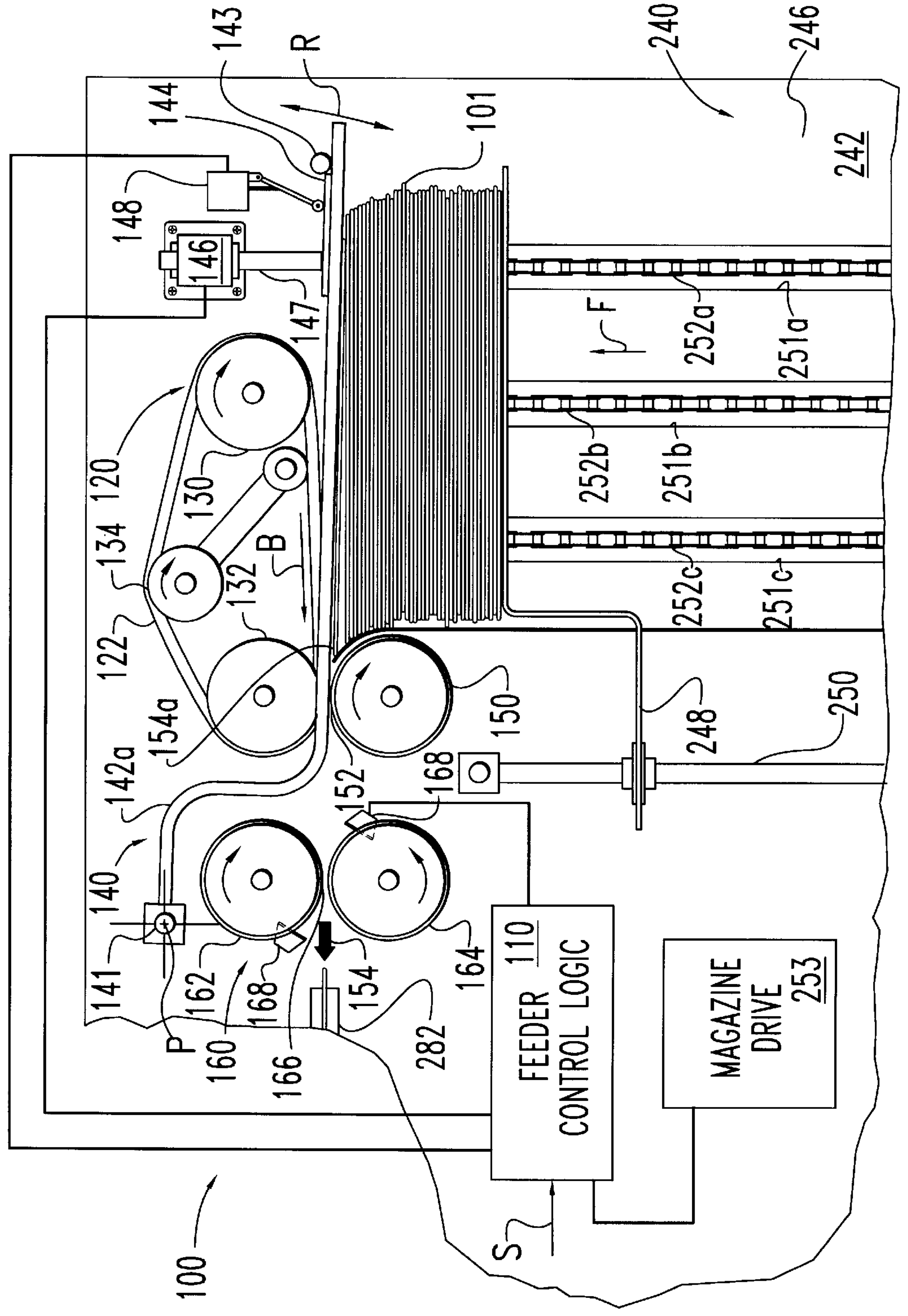
FIG. 6 is a top partial view of a feeder system of the present invention.
Figure 7:
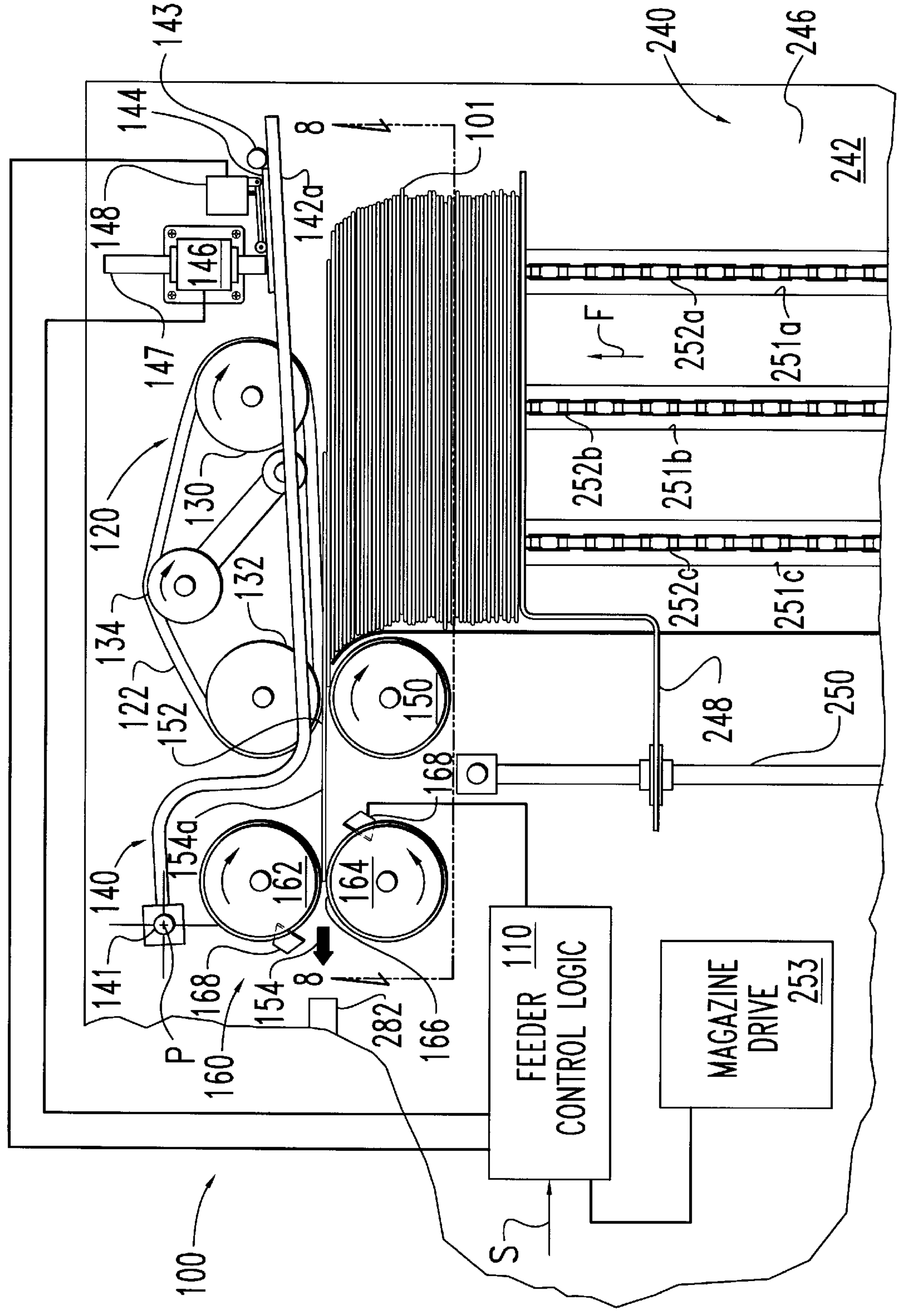
FIG. 7 is a top partial view of the feeder system of FIG. 6 in another position.
Figure 8:
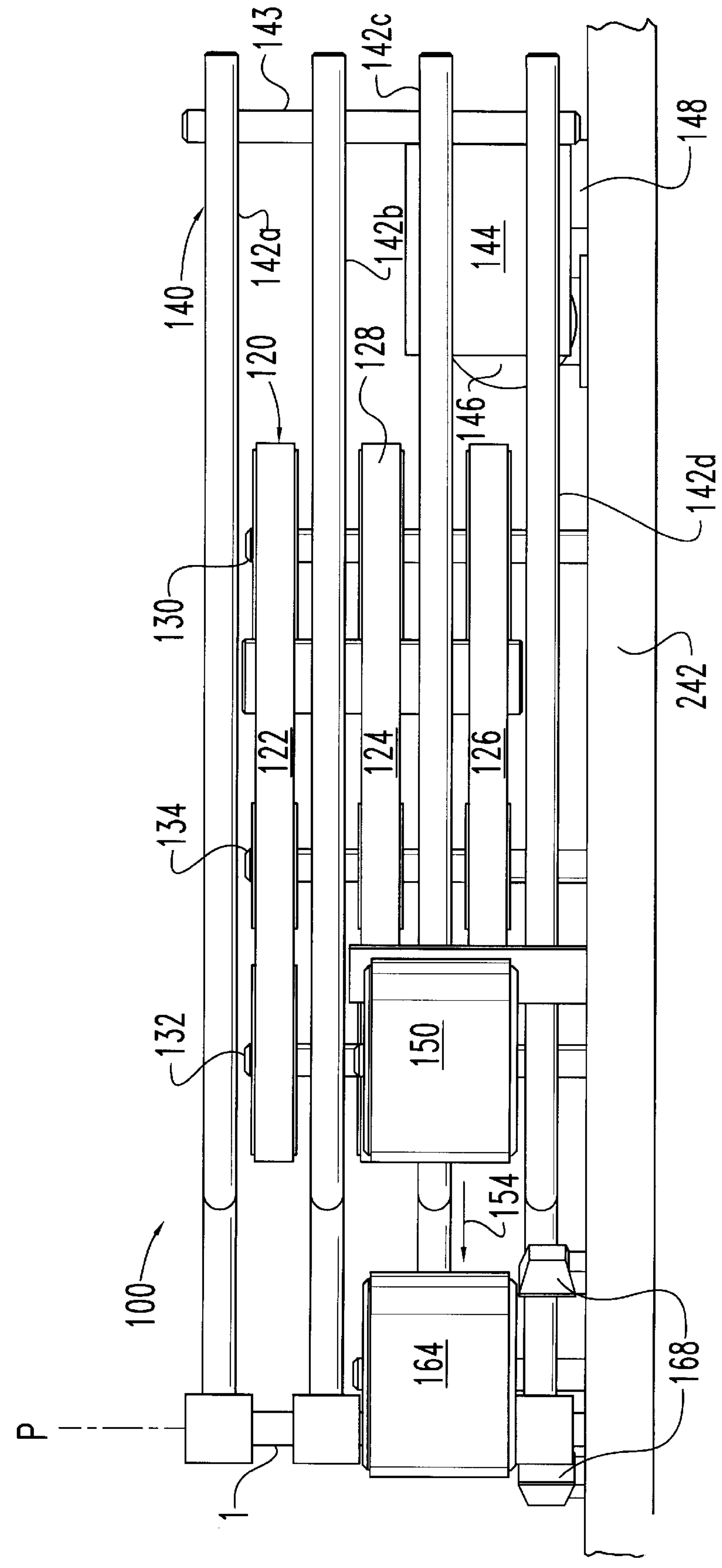
FIG. 8 is an elevational view of a portion of the feeder system shown in FIGS. 6 and 7.

Referring to FIGS. 6–8, feeder system 100 of the present invention is next described. Feeder system 100 may be used in lieu of feeder 26 depicted in FIG. 1.

Feeder system 100 selectively singulates and feeds mail pieces from mail row 101 to transport system 282 in response to a signal S received by feeder control logic 110. Feeder system 100 includes a magazine 240 with an input section 246 and bed 242. Bed 242 defines a number of recesses 251*a*, 251*b*, 251*c* in which corresponding chains 252*a*, 252*b*, 252*c* are located. Chains 252*a*, 252*b*, 252*c* are selectively driven in the direction of arrow F by magazine drive 253 in response to a magazine control signal from feeder control logic 110. Push plate 248 is slideably mounted to guide bar 250 and includes teeth (not shown) to selectively engage chains 252*a*, 252*b*, 252*c* for travel therewith. Plate 248 is configured to rotate about guide bar 250 to selectively disengage chains 252*a*, 252*b*, 252*c* to adjust for different size mail rows. Preferably, plate 248 is positioned to urge mail row 101 in the direction of arrow F with a predetermined amount of pressure.

Feeder system 100 also includes endless belt system 120 with upper belt 122, middle belt 124, and lower belt 126. Together, belts 122, 124, 126 define a moving contact belt face 128 to frictionally engage a mail piece for transport. Belts 122, 124, 126 are configured to move by rotating spindles 130, 132 by a motor (not shown). Also, endless belt assembly 120 includes idler 134. In other embodiments, idler 134 may be absent. Generally, belts 122, 124, 126 are rotated to move in the direction indicated by arrow B shown in FIG. 6.

Feed system 100 also has a gate assembly 140 with arms 142*a*, 142*b*, 142*c*, 142*d* (collectively designated arms 142) mounted to leg 141 and cross brace 143. Cross brace 143 and leg 141 are generally positioned at opposing ends of arms 142. Gate assembly 140 also has a contact plate 144 mounted to arms 142. Arms 142 are configured to interleave with belts 122, 124, 126 as shown in FIG. 8 and pivot about axis P generally coincident with leg 141.

Gate assembly 140 also has solenoid 146 with plunger 147 to selectively pivot arms 142 about axis P and along path R. Solenoid 146 is operatively coupled to feeder control logic 110 so that is selectively responds to a gate control signal from logic 110 to extend or retract plunger 147 (compare FIG. 6 and 7). Preferably, solenoid 146 is activated to extend plunger 147 in response to a discrete gate control signal. Besides solenoid 146, other actuators may be used such as a selectively driven motor connected to a rotating cam device. Also, a controllably rotated arm with rollers to contact plate 144 may alternatively be employed. In addition, a bell crank or crank arm may be used in conjunction with a translational or rotational device to provide an actuator suitable for gate assembly 140.

A pressure sensor 148 is associated with plate 144 to determine the amount of pressure exerted on arms 142 by mail row 101. Sensor 148 sends a corresponding pressure signal to feeder control logic 110. Preferably, pressure sensor 148 is of the microswitch variety providing a discrete digital signal corresponding to the existence of at least a predetermined level of pressure.

Roller 150 of feeder system 100 turns in a direction opposite the movement of belt contact face 128. Roller 150 is spaced apart from endless belt assembly 120 and gate assembly 140 to define a feed gap 152. Feed gap 152 is aligned with feed path 154 and nip 166 of pinch roller assembly 160.

Pinch assembly roller 160 includes pinch rollers 162, 164 to transport a mail piece to transport system 282. Pinch roller assembly 160 also includes a sensor 168 to provide a detection signal corresponding to the presence of a mail piece as it enters nip 166. Sensor 168 may be of an optical variety which sends a discrete signal corresponding to a mail piece blocking a beam of light.

Feeder system 100 operation is next discussed. Endless belt assembly 120, roller 150, and pinch roller assembly 160 are generally in free-running rotational motion, being driven by an associated driving motor (not shown) in a conventional manner. The direction of motion of various components is indicated by arrows superimposed thereon.

As shown in FIG. 6, gate assembly 140 has a hold position which presses against mail row 101 and away from endless belt assembly 120. In the hold position, plunger 147 of solenoid 146 is extended and bears against contact plate 144 to hold arms 142 against mail row 101. If push plate 248 is not positioned to provide adequate pressure of mail row 101 against gate assembly 140, then pressure sensor 148 sends the pressure signal to feeder control logic 110. Feeder control logic 110 responds by sending the magazine control signal to magazine drive 253 to correspondingly drive chains 252*a*, 252*b*, 252*c* to move push plate 248 along path F toward gate assembly 140 and restore adequate pressure. Once adequate pressure is obtained, the control logic 110 terminates activation of magazine drive 253.

In response to a feed signal S, feed control logic 110 sends the gate control signal to solenoid 146 to retract plunger 147. Upon retraction, gate assembly 140 changes position to selectively feed a leading mail piece 154*a* from mail row 101. Specifically, arms 142 pivot behind contact face 128 to a feed position as shown in FIG. 7.

In the feed position, face 128 contacts lead mail piece 154a to frictionally transport it through feed gap 152 along feed path 154 to nip 166 of pinch roller assembly 160. As lead mail piece moves along feed path 154, roller 150 generally discourages the feeding of additional mail pieces at the same time. Roller 150 turns in the same rotational direction as endless belt assembly 120 (e.g. clockwise or counterclockwise), but the surfaces of roller 150 and belts 122, 124, 126 approach one another moving in opposite directions as the superimposed arrows indicate. The coefficient of friction of the surface of roller 150 is generally less than the surface of belts 122, 124, 126 so that a mail piece in contact with face 128 tends to move along feed path 154 even if it also contacts roller 150. However, because the coefficient of friction between two adjacent letters is generally less than the coefficient of friction with contact face 128 or roller 150, multiple pieces fed into gap 152 at the same time typically result in the letter closest to belt contact face 128 being transported along feed path 154 with the remaining piece or pieces being transported in the opposite direction back to magazine 240 by roller 150.

As the edge of a leading mail piece 154*a* is detected by sensor 168 of pinch roller assembly 160, the detection signal is sent to feeder control logic 110. In response, feeder control logic extends plunger 147 to return gate assembly 140 to the hold position to await another feed signal S to feeder control logic 110. Notably, as mail pieces are singulated and fed by feeder system 100, mail row 101 decreases in size and the pressure on gate assembly 140 correspondingly drops. As a result, pressure sensor 148 periodically sends a pressure signal to feeder control logic 110 to drive chains 252*a*, 252*b*, 252*c* via drive 253 to reestablish the required pressure for the functioning of feeder system 100. Notably, when all mail has been fed, sensor 168 will fail to detect an edge of a mail piece. Such repeated failures could be used to report the possibility of an empty input section 246 or another feeder problem as may be appropriate.

Feeder assembly 100 provides a cost effective means for selectively feeding mail in a barcoding application. However, feeder assembly 100 may also be used to enhance a variety of mail handling systems. Preferably, feeder control logic 110 comprises discrete logic components to provide a reliable and cost effective controller. Other controllers suitable to provide feeder control logic 110 are of the microprocessor variety. In an embodiment of station 10 using feeder system 100 in lieu of feeder 26, processor 50 may be adapted to include feeder control logic 110 using methods known to those skilled in the art.

All publications, patents, and patent applications cited in this specification are herein incorporated by reference as if each individual publication, patent, or patent application were specifically and individually indicated to be incorporated by reference and set forth herein in its entirety.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mail barcode evaluation method, comprising the steps of:

(1) feeding a mail piece with a barcode to an imaging device for evaluation;

(2) generating an image of the barcode with the imaging device;

(3) evaluating the image generated in step (2) with a processor to identify a first barcode defect; and (4) visually presenting a first marker after said evaluating to indicate location of the first barcode defect along the barcode.

2. The method of claim 1, wherein step (4) includes printing a report with a visual image of the barcode and the first marker.

3. The method of claim 1, wherein step (3) includes identifying a second barcode defect for the mail piece, and step (4) includes visually presenting a second marker indicating location of the second barcode defect.

4. The method of claim 3, wherein step (4) further includes printing a report including the visual image of the barcode, the first marker, and the second marker.

5. The method of claim 4, wherein the first marker corresponds to a barcode readability warning and the second marker corresponds to a barcode readability failure for the mail piece.

6. The method of claim 1, further comprising the steps of:

(5) decoding the barcode to provide a decoded address corresponding to the barcode; and (6) visually presenting the decoded address and an image of at least a portion of an address appearing on the mail piece to determine if the barcode is defective.

7. The method of claim 6, further comprising the steps of:

(7) determining a defect state corresponding to the first barcode defect identified in step (3), the defect state being selected from among at least four defect states by the processor and the defect state being indicated by the first marker;

(8) printing a report with a visual image of the barcode and the first marker; and (9) printing an identifying mark on the mail piece.

8. A system for evaluating barcoded mail, comprising:

an imaging device configured to provide an image signal corresponding to an image of a barcode from a mail piece;

a transport device configured to selectively deliver the mail piece to said imaging device for evaluation;

an output device for providing evaluation results;

a processor receiving said image signal, said processor being configured to compare said image signal to barcode requirements data to detect a barcode defect, said processor being configured to provide an output signal to said output device if said barcode defect is detected; and, wherein said output device responds to said output signal to provide a visual barcode defect marker, said marker indicating said barcode defect location.

9. The system of claim 8, wherein said output device includes a printer to provide a report, said report including a visual image of said barcode with said marker.

10. The system of claim 8, further comprising a print head to print an identifying mark on the mail piece.

11. The system of claim 8, wherein said output device includes a print head configured to print said marker on the mail piece to indicate location of said barcode defect.

12. The system of claim 8, further comprising:

a first bin coupled to said transport device, said first bin being configured to hold a number of barcoded mail pieces for delivery to said imaging device one at a time by said transport device; and a second bin coupled to said transport device, said second bin being configured to recieve at least a portion of the number of barcoded mail pieces after evaluation.

13. The system of claim 12, wherein said transport device includes a feeder configured to feed a leading mail piece from said first bin, said feeder including:

(a) an endless turning belt with a moving contact face adapted to frictionally engage the leading mail piece;

(b) a pivotable arm configured to hold the leading mail piece away from said face and to selectively pivot to a feed position behind said face to facilitate feeding of the leading mail piece by said belt; and (c) a controllable actuator configured to selectively move said arm between the hold and feed positions.

14. The system of claim 13, wherein said transport device further includes:

a roller positioned opposite said face to define a feed gap therebetween, said roller turning in the same rotational direction as said belt to discourage transport of multiple mail pieces; and a conveyor with a nip aligned with said feed gap to receive the leading mail piece after transport by said belt.

15. A system for evaluating barcoding mail, comprising:

an image device configured to provide an image signal corresponding to a barcode and at least a portion of a destination address of a mail piece;

an output device for providing evaluation results;

a processor receiving said image signal, said processor being configured to decode said barcode from said image signal to generate a decoded address signal corresponding to an address decoded from the barcode, said processor being configured to provide an output signal to said output device in accordance with said decoded address signal and image signal; and, wherein said output device responds to said output signal to provide a decoded address image corresponding to said decoded address signal and a mail piece image corresponding to said image signal, said decoded address image and said mail piece image being visually presented by said output device for comparison.

16. The system of claim 15, wherein said output device includes a display for viewing by an operator.

17. The system of claim 15, wherein said processor compares a portion of said image signal to barcode requirements data to detect a barcode readability defect.

18. The system of claim 15, wherein said imaging device, and said output device are electrically coupled to said processor.

19. The system of claim 15, further comprising:

a first bin configured to hold a number of barcoded mail pieces for evaluation; and a transport device coupled to said first bin and said processor, said transport device being configured to selectively deliver each of the number of barcoded mail pieces one at a time to said imaging device in response to a transport signal from said processor.

20. The system of claim 19, further comprising a second bin coupled to said transport device, said transport device being configured to deliver at least a portion of the number of barcoded mail pieces to said second bin after evaluation.

21. A mail barcode evaluation method, comprising the steps of:

(1) feeding a mail piece to an imaging device for evaluation;

(2) generating an image of a barcode from the mail piece with the imaging device;

(3) evaluating the image with a processor to identify a barcode defect;

(4) determining a defect state corresponding to the barcode defect identified in step (3), the defect state being selected from among at least four defect states by the processor; and (5) printing a report with an image of the barcode and a marker, the marker indicating the defect state determined in step (4).

22. The method of 21, wherein the defect state is selected from among at least ten defect states by the processor.

23. The method of 21, wherein the defect state is selected from among at least sixteen defect states by the processor.

24. The method of 21, wherein the marker indicates location of the barcode defect along the barcode.

25. The method of claim 21, further comprising the steps of:

(6) decoding the barcode to provide a decoded address corresponding to the barcode; and (7) visually presenting the decoded address and an image of at least a portion of an address appearing on the mail piece to determine if the barcode is accurate.

26. A mail barcode evaluation method, comprising:

(a) feeding a mail piece with a barcode to an imaging device for evaluation, the barcode having a number of bars;

(b) generating an image of the barcode with the imaging device;

(c) evaluating the image of the barcode with a processor to identify a first barcode defect; and (d) visually presenting a first marker to indicate location of the first barcode defect along the barcode, the first marker identifying a first defective on the bars.

27. The method of claim 26, further comprising classifying the first barcode defect as one of a number of different predetermined defect states.

28. The method of claim 27, wherein a first one of the defect states corresponds to improper sizing of at least one of the bars, and a second one of the defect states corresponds to improper spacing of the bars.

29. The method of claim 26, further comprising printing a report showing the barcode and the first marker.

30. The method of claim 26, further comprising:

(e) decoding the barcode to provide a decoded address;

(f) imaging at least a portion of an address block on the mail piece to provide an address image; and (g) determining the barcode is inaccurate by visually comparing the decoded address and the address image on a display.

31. The method of claim 26, further comprising:

(e) detecting a second defect; and (f) providing a second marker identifying a second defective one of the bars.

* * * * *